J. HUGHES.

Harness-Pads.

No. 5,629. Reissued Oct. 28, 1873.

WITNESSES.

P. Franzand Lane

Boyd Eliot

John Hughes

INVENTOR.

AM. PHOTO-LITHOGRAPHIC Co. N.Y. (OSBORNE'S PROCESS)

UNITED STATES PATENT OFFICE.

JOHN HUGHES, OF NEWARK, NEW JERSEY.

IMPROVEMENT IN HARNESS-PADS.

Specification forming part of Letters Patent No. 74,691, dated February 18, 1868; reissue No. 5,629, dated October 28, 1873; application filed August 5, 1873.

*To all whom it may concern:*

Be it known that I, JOHN HUGHES, of Newark, in the county of Essex and State of New Jersey, have invented certain Improvements in Harness-Pads, of which the following is a specification:

This invention pertains to that class of devices known as harness-pads, or the saddle that supports upon the back of a horse the hook for the check-rein, and the terrets or rings that serve as guides to the gig or guiding reins; and the invention consists in the use of an iron frame, peculiarly constructed, to receive and retain the hook and the terrets, and the pads or cushions, with their proper coverings or trimmings, as will hereinafter appear.

Figure 1:
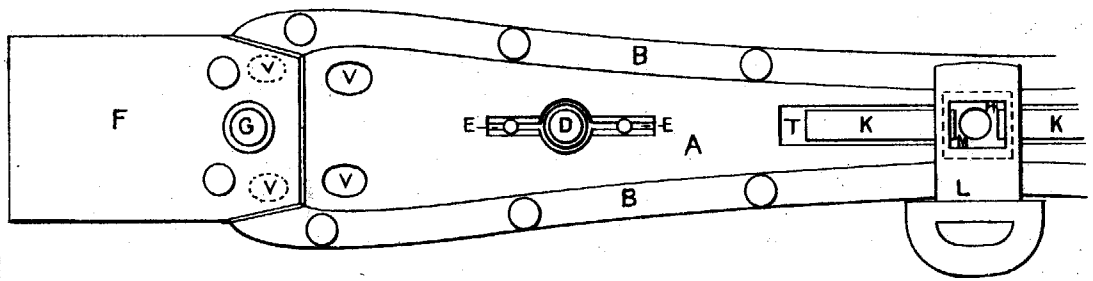
Figure 4:
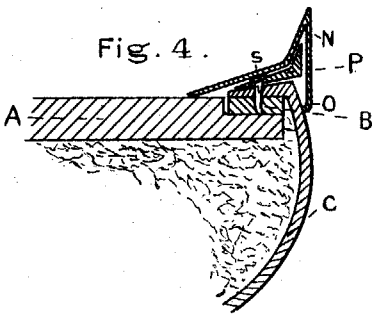
Figure 3:
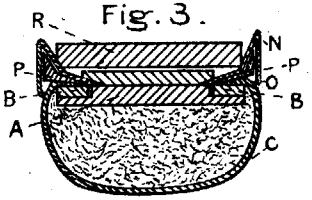
Figure 5:
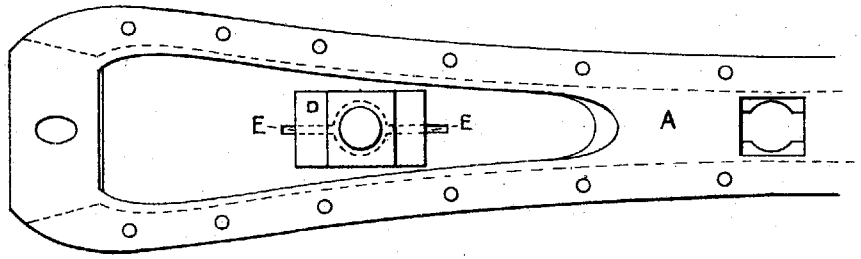
Figure 2:
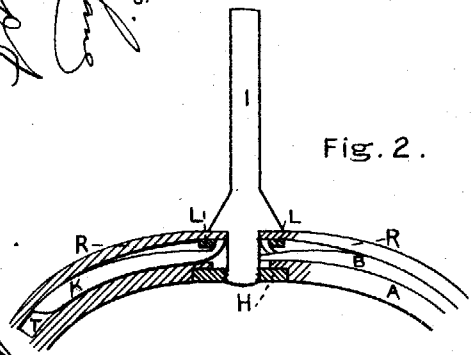

Figure 1 is a top view of a portion of the skeleton-frame, of iron, with some of the trimmings attached. Fig. 2 is a longitudinal section through the center of a portion of the frame with the check-rein hook in elevation. Fig. 3 is a transverse section of the frame and pad as completed. Fig. 4 is also a transverse section of a portion of the pad and frame and covering, enlarged, to show the relative position of some of the parts; and Fig. 5 is an outline of a portion of the frame as seen from the under side, to show the recess therein for the nuts that hold the terrets in working position.

The iron frame is shown at A, and corresponds substantially, in width and shape, to the pad-top or back-strap to which the girth or belly-band is fastened. At B B, upon the iron frame, are secured strips of leather or some equivalent, to which the bottom or cushion C of the pad is attached, either by nails or in other suitable manner. These strips B B may be let into the frame A in rabbets, as shown at Figs. 3 and 4, or they may be fastened on the top of the frame, if preferred. Suitable recesses are also formed in the under side of the frame, to receive the nuts D for holding the terrets in position, and said nuts can be moved to and fro in said recesses, as best seen at E E, Fig. 5, to suit any required adjustment. In the frame A are also holes, as at V V, for fastening the tufts upon the cushion. At the extremities or each lower end of the frame A is fastened a piece of leather or other flexible material, as at F, which forms a continuation or part of the foundation for the pad, and which, being flexible, accommodates itself to the sides of the horse. Where said pieces F are joined to the iron frame A there are nuts, as at G, to receive screws for holding the pads upon the frame, and said nuts may be made also adjustable in recesses, as already referred to at E E. The frame A has also at the center a socket or recess on the under side to receive a nut, as at H, to hold the check-rein hook at I firmly thereon; and said recess serves to conceal the nut, so that it may be smooth with the lower surface of the frame, as best seen at Fig. 2, and it also may serve to hold the nut from turning, so as to loosen the hook, as the hook itself is prevented from turning or getting loose by means of the two braces or keys at K K, or other similar devices, which are placed in a recess, as at T, in the frame. Said keys or braces are placed under the croup-loop at L, which is held fast upon the frame by the hook when in position, and their ends next to the hook are turned up into recesses, as at M, in the croup-loop, and on opposite sides of the square shank of the hook, so as to prevent its being turned until they are removed. The binding edge of the pad is stitched onto the bottom C, at O, Figs. 3 and 4, before the pad is put together. There is also a form or shaping-piece, as seen at P, over which the binding is folded. (Best seen in the enlarged view at Fig. 4.)

To unite the parts together, the edges of the bottom C are turned over on the strips B B, and, with the lower edges of the forms, as at P, are secured to the strips by stitching, if desired, but ordinarily by nails or tacks, as at S, Fig. 4, which, passing through the strips B B, are clinched on the under side by coming in contact with the iron frame. Then the upper strap R of the pad, called the pad-top, is laid between the bindings, which cover the frame on either side, and said top covers the inner edges of the bindings themselves, which are folded around the forms, and said strap R is held in a fixed position by finishing-screws, the terrets and hook already referred to passing through it, they being bound to the frame by the screw-nuts on the under side. Such a construction of a harness-pad saves greatly in both stock and time, and consequently expense, and it is so very simple in construction that ordinary workmen can put it together.

I therefore claim—

1. In an iron frame for a harness-pad, as described, the socket or recess for the nut H of the check-rein hook, as and for the purposes set forth.

2. In combination with the frame, as described, the strips B B for attaching the bottom and binding to the frame, substantially as described.

3. In combination with the iron frame of a harness-pad, the flexible pieces or foundations F, as described.

4. The braces K K, or their equivalents, as and for the purposes specified.

5. The binding and the bottom piece, stitched together in a flat condition before being applied to the frame, in combination with an interposed form, substantially as described.

6. The frame A, provided with recesses E E for screw-nuts, and with or without the rabbets B B, and holes V V, as and for the purposes set forth.

JOHN HUGHES.

Witnesses:
P. VANZANDT LANE,
BOYD ELIOT.